(12) United States Patent
Wu et al.

(10) Patent No.: US 7,816,902 B2
(45) Date of Patent: Oct. 19, 2010

(54) INTEGRATED CIRCUIT INCLUDING A CONTROLLER FOR REGULATING A POWER SUPPLY

(75) Inventors: Gong Xiao Wu, Singapore (SG); Lim Kok Kee, Singapore (SG); Kok Siu Kam, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 274 days.

(21) Appl. No.: 11/931,544

(22) Filed: Oct. 31, 2007

(65) Prior Publication Data

US 2009/0109718 A1    Apr. 30, 2009

(51) Int. Cl.
*G05F 1/46* (2006.01)
*H02M 3/335* (2006.01)

(52) U.S. Cl. .................. 323/349; 323/288; 363/21.07; 363/21.15

(58) Field of Classification Search ................ 323/282, 323/284, 285, 288, 349, 351, 318; 363/89, 363/100, 147, 21.07, 21.15
See application file for complete search history.

(56) References Cited

U.S. PATENT DOCUMENTS

| 5,859,768 | A | 1/1999 | Hall et al. |
| 6,856,519 | B2 | 2/2005 | Lin et al. |
| 7,279,874 | B2 * | 10/2007 | Masuda ...................... 323/282 |
| 7,394,669 | B2 * | 7/2008 | Fahlenkamp et al. ..... 363/21.15 |
| 7,586,298 | B2 * | 9/2009 | Tabaian et al. ............... 323/288 |

* cited by examiner

*Primary Examiner*—Gary L Laxton
(74) *Attorney, Agent, or Firm*—Dicke, Billig & Czaja, PLLC

(57) ABSTRACT

An integrated circuit includes a controller configured to regulate an output of a power supply based on a first signal. The integrated circuit includes an input configured to receive the first signal and to be coupled to an external capacitor that sets an adjustable blanking time for the power supply.

12 Claims, 13 Drawing Sheets

INTEGRATED CIRCUIT INCLUDING A CONTROLLER FOR REGULATING A POWER SUPPLY

BACKGROUND

Voltage converters are used in a wide variety of applications. One type of voltage converter is a switched mode power supply (SMPS). A SMPS power supply can be operated in a discontinuous conduction mode (DCM) or in a continuous conduction mode (CCM). A SMPS power supply is typically controlled by a CCM or DCM flyback converter controller. A converter controller typically has a limited pin count to minimize size and cost. Users of the controllers, however, prefer many adjustable options for configuring the controllers.

Typical functions that may be performed by a controller include a blanking time function, an external shutdown function, an internal frequency selection function, a brownout function, and a variable soft start function. The blanking time function is used for the detection of an overload condition. The controller receives a feedback signal from the voltage converter for regulating the voltage converter. If the feedback signal exceeds a preset voltage, the voltage converter is believed to be in an overload condition. The feedback signal may include some voltage spikes, however, so to avoid a mistaken overload condition the blanking time function is used. Therefore, the feedback signal must exceed the preset voltage for a specific time, i.e., the blanking time, before the voltage converter is considered to be in an overload condition.

The blanking time function is typically implemented using an analog or a digital design. The analog design typically uses a capacitor where the charging time of the capacitor is used to set the blanking time. The digital design typically uses a counter where the count is used to set the blanking time. The analog design uses more current and chip space than the digital design, but for an externally connected capacitor the blanking time is easily adjustable. The blanking time is not easily adjustable using a digital design.

For these and other reasons, there is a need for the present invention.

SUMMARY

One embodiment provides an integrated circuit. The integrated circuit includes a controller configured to regulate an output of a power supply based on a first signal. The integrated circuit includes an input configured to receive the first signal and to be coupled to an external capacitor that sets an adjustable blanking time for the power supply.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
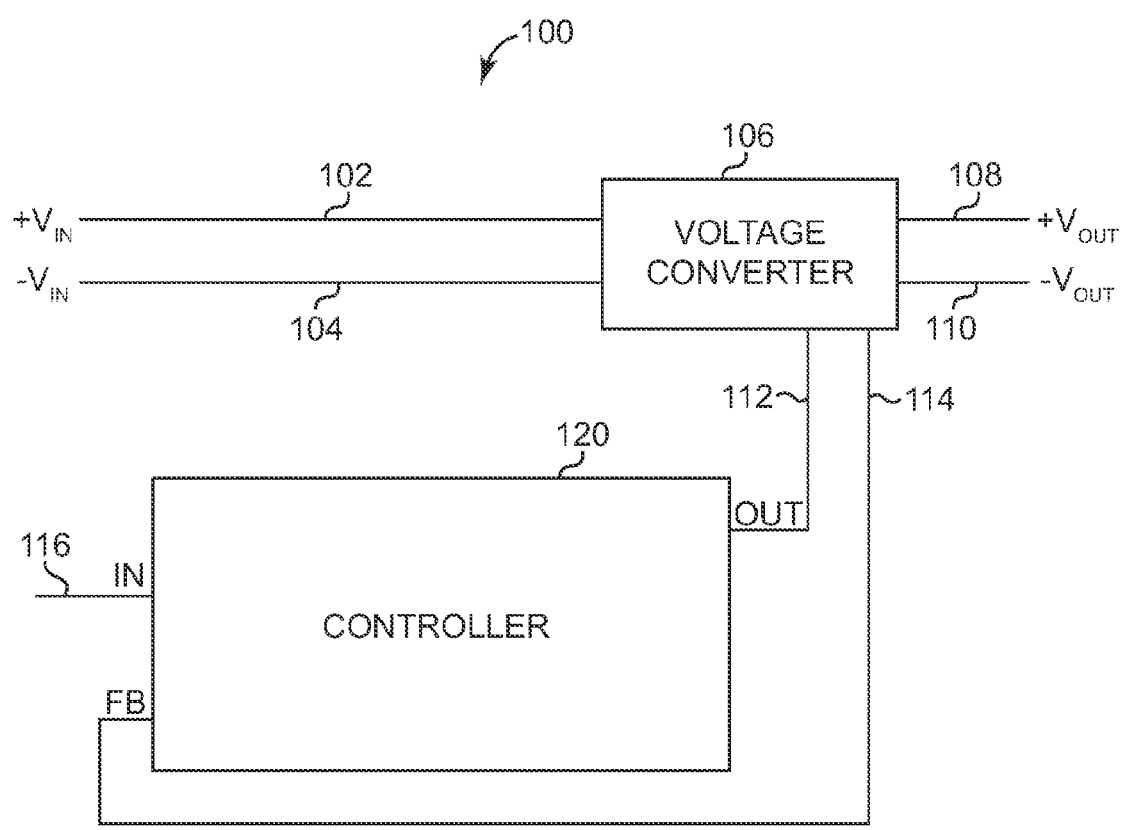
FIG. 1 is a block diagram illustrating one embodiment of a voltage converter system.

FIG. 1 is a block diagram illustrating one embodiment of a voltage converter system 100. Voltage converter system 100 includes a voltage converter 106 and a controller 120. In one embodiment, controller 120 is an integrated circuit or part of an integrated circuit. In one embodiment, voltage converter system 100 is a switched mode power supply (SMPS). The SMPS power supply can be operated in a discontinuous conduction mode (DCM) or in a continuous conduction mode (CCM). In one embodiment, controller 120 is a CCM or DCM flyback converter controller. Voltage converter 106 is a DC to DC converter, an AC to DC converter, or other suitable converter.

The input of voltage converter 106 receives an input voltage applied between $+V_{IN}$ signal path 102 and $-V_{IN}$ signal path 104. The output of voltage converter 106 provides a converted voltage on $+V_{OUT}$ signal path 108 and $-V_{OUT}$ signal path 110. Voltage converter 106 is electrically coupled to controller 120 through OUT signal path 112 and feedback (FB) signal path 114. An input of controller 120 receives the IN signal on IN signal path 116. IN signal path 116, FB signal path 114, and OUT signal path 112 are electrically coupled to input/output pads or pins of controller 120.

Controller 120 regulates voltage converter 106 using the OUT signal on OUT signal path 112 based on the FB signal received from voltage converter 106 through FB signal path 114. Controller 120 also receives the IN signal on IN signal path 116 from voltage converter 106 and/or other circuits to control various functions of voltage converter 106 and/or controller 120. In one embodiment, controller 120 provides an adjustable blanking time for overload protection of voltage converter 106 and receives the feedback signal from voltage converter 106 on a single pin. In this embodiment, an external capacitor (not shown) for providing an adjustable blanking time for overload protection is coupled to FB signal path 114.

In another embodiment, controller 120 receives the IN signal on IN signal path 116 from voltage converter 106 and/or other circuits to provide multiple functions on a single pin. In one embodiment, a blanking time function, an external shutdown function, and an internal oscillator frequency selection function are provided on a single pin of controller 120. In another embodiment, a blanking time function, an external shutdown function, and a brownout function are provided on a single pin of controller 120. In another embodiment, a blanking time function, an external shutdown function, and a variable soft start function are provided on a single pin of controller 120. In other embodiments, other various combinations of functions are provided on a single pin of controller 120.

Figure 2:
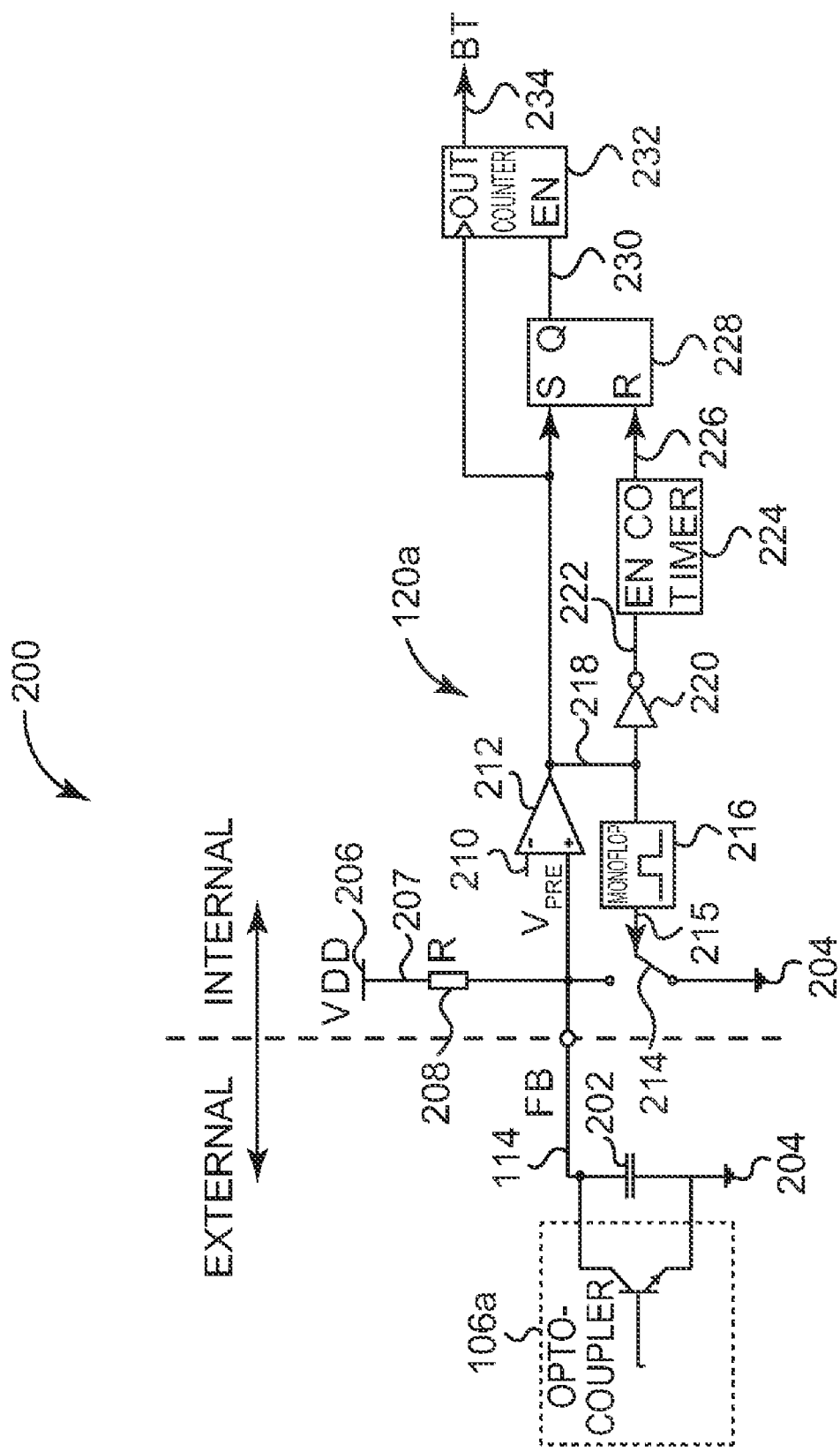
FIG. 2 is a schematic diagram illustrating one embodiment of a circuit for providing a blanking time function and receiving a feedback signal on a single pin of a controller.

FIG. 2 is a schematic diagram illustrating one embodiment of a circuit 200 for providing a blanking time function and receiving a feedback signal on a single pin of controller 120. Circuit 200 includes a portion external to controller 120 including a portion 106a of voltage converter 106 and an external capacitor 202. In one embodiment, circuit 106a includes an opto-coupler or another suitable device of voltage converter 106 to provide a feedback signal for regulating voltage converter 106. Circuit 200 also includes a portion 120a internal to controller 120. Internal portion 120a includes a voltage source (VDD) 206, a resistor 208, a comparator 212, a switch 214, a monoflop 216, an inverter 220, a timer 224, a latch 228, and a counter 232.

Circuit 106a is electrically coupled to one side of external capacitor 202 through FB signal path 114 and to ground 204. The other side of external capacitor 202 is electrically coupled to ground 204. FB signal path 114 is electrically coupled to one side of resistor 208, the positive input of comparator 212, and one side of switch 214. The other side of resistor 208 is electrically coupled to voltage source 206 through signal path 207. The other side of switch 214 is electrically coupled to ground 204. The negative input of comparator 212 receives a preset voltage ($V_{PRE}$) on signal path 210. In one embodiment, $V_{PRE}$ is 4.5V or another suitable voltage. The output of comparator 212 is electrically coupled to the clock input of counter 232, the set (S) input of latch 228, the input of monoflop 216, and the input of inverter 220 through signal path 218.

The output of monoflop 216 is electrically coupled to the control input of switch 214 through signal path 215. The output of inverter 220 is electrically coupled to the enable (EN) input of timer 224 through signal path 222. The output (CO) of timer 224 is electrically coupled to the reset (R) input of latch 228 through signal path 226. The output (Q) of latch 228 is electrically coupled to the enable (EN) input of counter 232 through signal path 230. Counter 232 provides a blanking time (BT) signal on BT signal path 234.

Circuit 106a provides a feedback signal on FB signal path 114 from voltage converter 106 for regulating voltage converter 106. External capacitor 202 is selected to provide a desired blanking time. The signal on signal path 215 controls the operation of switch 214. In response to a logic low signal on signal path 215, switch 214 opens to electrically disconnect FB signal path 114 from ground 204. In response to a logic high signal on signal path 215, switch 214 closes to electrically connect FB signal path 114 to ground 204. With switch 214 open, voltage source 206 and resistor 208 charge external capacitor 202 through FB signal path 114. With switch 214 closed, external capacitor 202 is discharged to ground 204 through switch 214.

Comparator 212 compares the voltage of the FB signal on FB signal path 114 to $V_{PRE}$ on signal path 210 to provide the signal on signal path 218. In response to the voltage of the FB signal rising above $V_{PRE}$, comparator 212 outputs a logic high signal on signal path 218. In response to the voltage of the FB signal being less than $V_{PRE}$, comparator 212 outputs a logic low signal on signal path 218.

Monoflop 216 receives the signal on signal path 218 to provide the signal on signal path 215. In response to a logic high signal on signal path 218, monoflop 216 provides a logic high pulse on signal path 215, which temporarily closes switch 214. In response to a logic low signal on signal path 218, monoflop 216 maintains a logic low signal on signal path 215 such that switch 214 remains open. Inverter 220 inverts the signal on signal path 218 to provide the signal on signal path 222.

The enable input of timer 224 receives the signal on signal path 222 to provide the signal on signal path 226. In response to a logic low signal on signal path 222, timer 224 is disabled and timer 224 outputs a logic low signal on signal path 226. In response to a logic high signal on signal path 222, timer 224 is enabled and begins timing. Once timer 224 reaches a preset time, such as 1 ms, timer 224 outputs a logic high signal on signal path 226.

The set input of latch 228 receives the signal on signal path 218 and the reset input of latch 228 receives the signal on signal path 226 to provide the signal on signal path 230. In response to a logic high signal on signal path 218, latch 228 is set and outputs a logic high signal on signal path 230. In response to a logic high signal on signal path 226, latch 228 is reset and outputs a logic low signal on signal path 230.

The enable input of counter 232 receives the signal on signal path 230 and the clock input of counter 232 receives the signal on signal path 218 to provide the BT signal on BT signal path 234. In response to a logic low signal on signal path 230, counter 232 is disabled. With counter 232 disabled, the count of counter 232 is reset to zero and counter 232 outputs a logic low BT signal. In response to a logic high signal on signal path 230, counter 232 is enabled. With counter 232 enabled, counter 232 increments in response to each rising edge of the signal on signal path 218. Once counter 232 reaches a preset count, counter 232 outputs a logic high BT signal.

During normal operation, the voltage of the FB signal on FB signal path 114 provides a feedback voltage that is used to regulate voltage converter 106. During normal operation, this feedback voltage is below $V_{PRE}$, which is the threshold voltage used to detect an overload condition. During an overload condition, the voltage of the FB signal on FB signal path 114 exceeds $V_{PRE}$ and is not used for regulation. Hence, during an overload condition there is no regulation and power is limited by only a current limitation and not the voltage of the FB signal. Therefore, the voltage of the FB signal can be used during this time for the blanking time.

During an overload condition in response to the voltage of the FB signal exceeding $V_{PRE}$, comparator 212 outputs a logic high signal on signal path 218, which enables counter 232 and initiates the blanking time. In response to the logic high signal on signal path 218, monoflop 216 closes switch 214 for a short duration. With switch 214 closed, the voltage of the FB signal on FB signal path 114 is shorted to ground. Once switch 214 opens, the voltage of the FB signal ramps up due to voltage source 206 and resistor 208 charging external capacitor 202. Once the voltage of the FB signal again exceeds $V_{PRE}$, comparator 212 again outputs a logic high signal on signal path 218, which increments counter 232. The process is repeated until the count of counter 232 reaches a preset count, at which time counter 232 outputs a logic high BT signal on BT signal path 234 to indicate that the blanking time has elapsed. The logic high BT signal triggers controller 120 to enter an overload protection mode.

When the FB signal is shorted to ground through switch 214, comparator 212 outputs a logic low signal on signal path 218. With the signal on signal path 218 logic low, timer 224 begins timing. If within a preset time the voltage of the FB signal does not exceed $V_{PRE}$, it is assumed that voltage converter 106 has recovered from the overload condition. Once the preset time is reached, the regulation is returned to the voltage of the FB signal and the power is no longer limited by only the current limitation. In addition, the count of counter 232 is reset to zero. The blanking time is adjusted to a desired length by selecting a suitable external capacitor 202.

Figure 3:
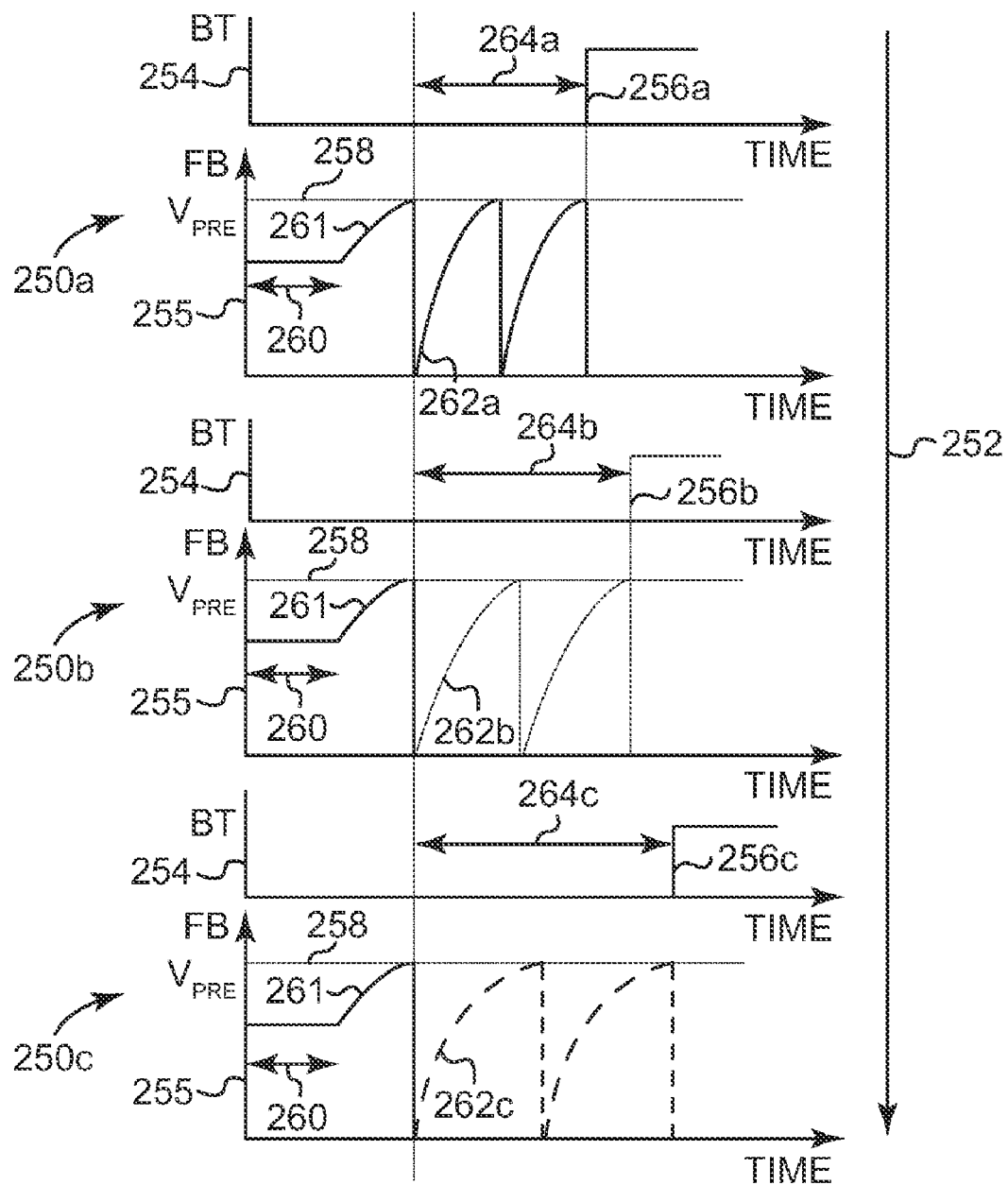
FIG. 3 is three timing diagrams illustrating one embodiment of adjusting the blanking time of the circuit illustrated in FIG. 2.

FIG. 3 is three timing diagrams 250a-250c illustrating one embodiment of adjusting the blanking time of circuit 200. Each timing diagram 250a-250c includes the BT signal 254 on BT signal path 234 and the FB signal 255 on FB signal path 114. During normal operation, FB signal 255 remains below $V_{PRE}$ 258 as indicated at 260. During an overload condition, FB signal 255 starts ramping up as indicated at 261. In response to the FB signal reaching $V_{PRE}$ 258, the blanking time begins and external capacitor 202 is discharged through switch 214. With switch 214 open, external capacitor 202 is charged by voltage source 206 as indicated at 262a-262c until the FB signal again reaches $V_{PRE}$ 258 and the process is repeated. The process is repeated until counter 232 reaches a preset count (two in this embodiment), such that counter 232 provides a logic high BT signal 254 as indicated at 256a-256c.

The capacitance of external capacitor 202 determines the time used to charge external capacitor 202. The capacitance of external capacitor 202 increases from timing diagram 250a to timing diagram 250c as indicated at 252. As the capacitance of external capacitor 202 increases, the blanking time increases as indicated at 264a-264c. Timing diagram 250a illustrates a shorter blanking time as indicated at 264a than the blanking time indicated at 264b illustrated by timing diagram 250b. Timing diagram 250b illustrates a shorter blanking time as indicated at 264b than the blanking time indicated at 264c illustrated by timing diagram 250c. Therefore, by selecting a suitable external capacitor 202, the blanking time can be adjusted to a desired value.

Figure 4:
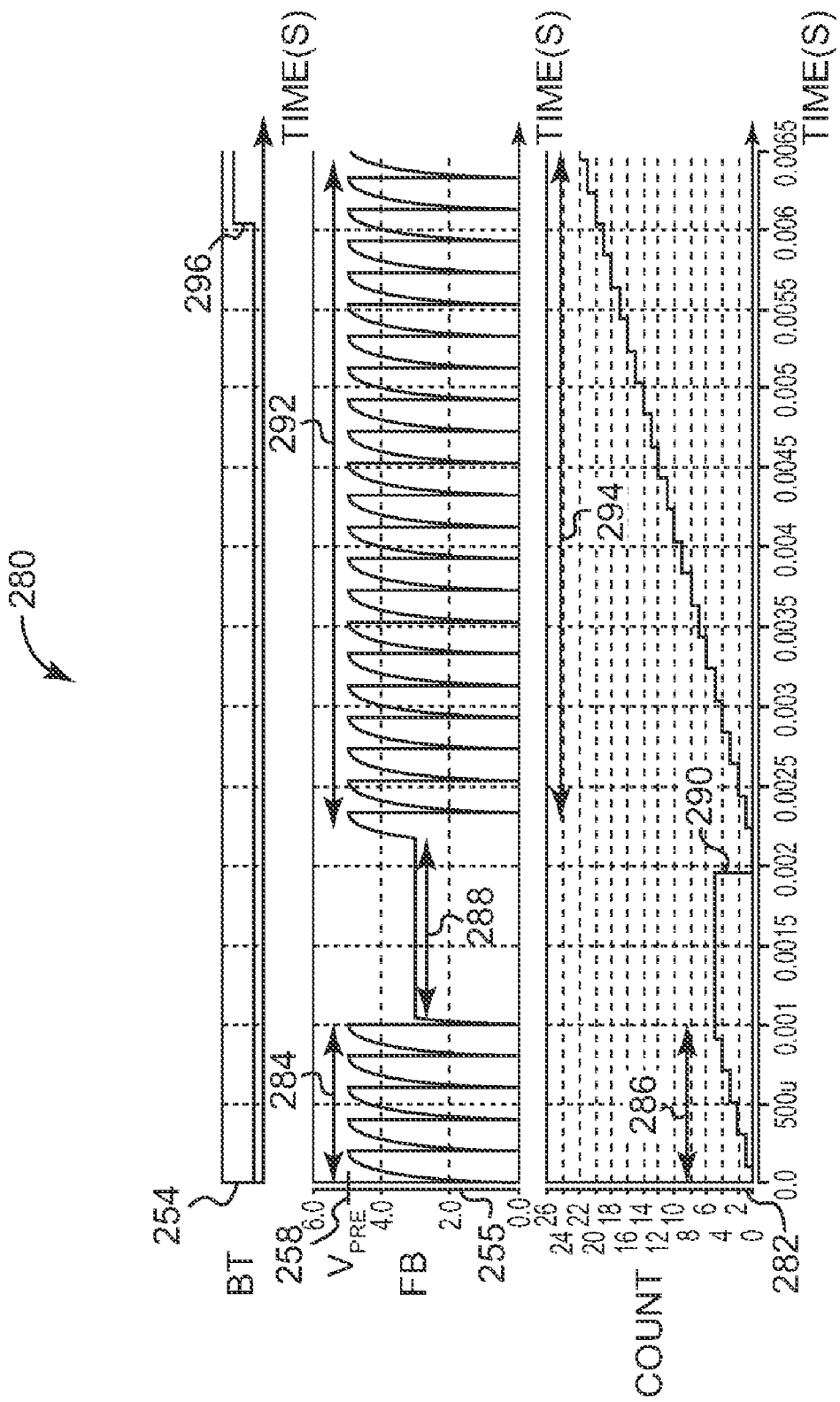
FIG. 4 is a timing diagram illustrating one embodiment of the blanking time function of the circuit illustrated in FIG. 2.

FIG. 4 is a timing diagram 280 illustrating one embodiment of the blanking time function of circuit 200. Timing diagram 280 includes BT signal 254 on BT signal path 234, FB signal 255 on FB signal path 114, and count 282 of counter 232. As indicated during period 284, FB signal 255 exceeds $V_{PRE}$ 258 indicating an overload condition. External capacitor 202 is charged and discharged five times before voltage converter 106 recovers from the overload condition and returns back to normal operation as indicated at 288. During the overload condition period 284, counter 232 increments as indicated at 286. During the normal operation period 288, timer 224 starts timing and resets counter 232 to zero once timer 224 reaches its preset time as indicated at 290.

As indicated during period 292, FB signal 255 again exceeds $V_{PRE}$ 258 indicating an overload condition. External capacitor 202 is charged and discharged 20 times, which in this embodiment is the preset count for counter 232. In response to the count of counter 232 reaching the preset count of 20, counter 232 outputs a logic high BT signal 254 at 296 to place controller 120 into an overload protection mode.

Figure 5:
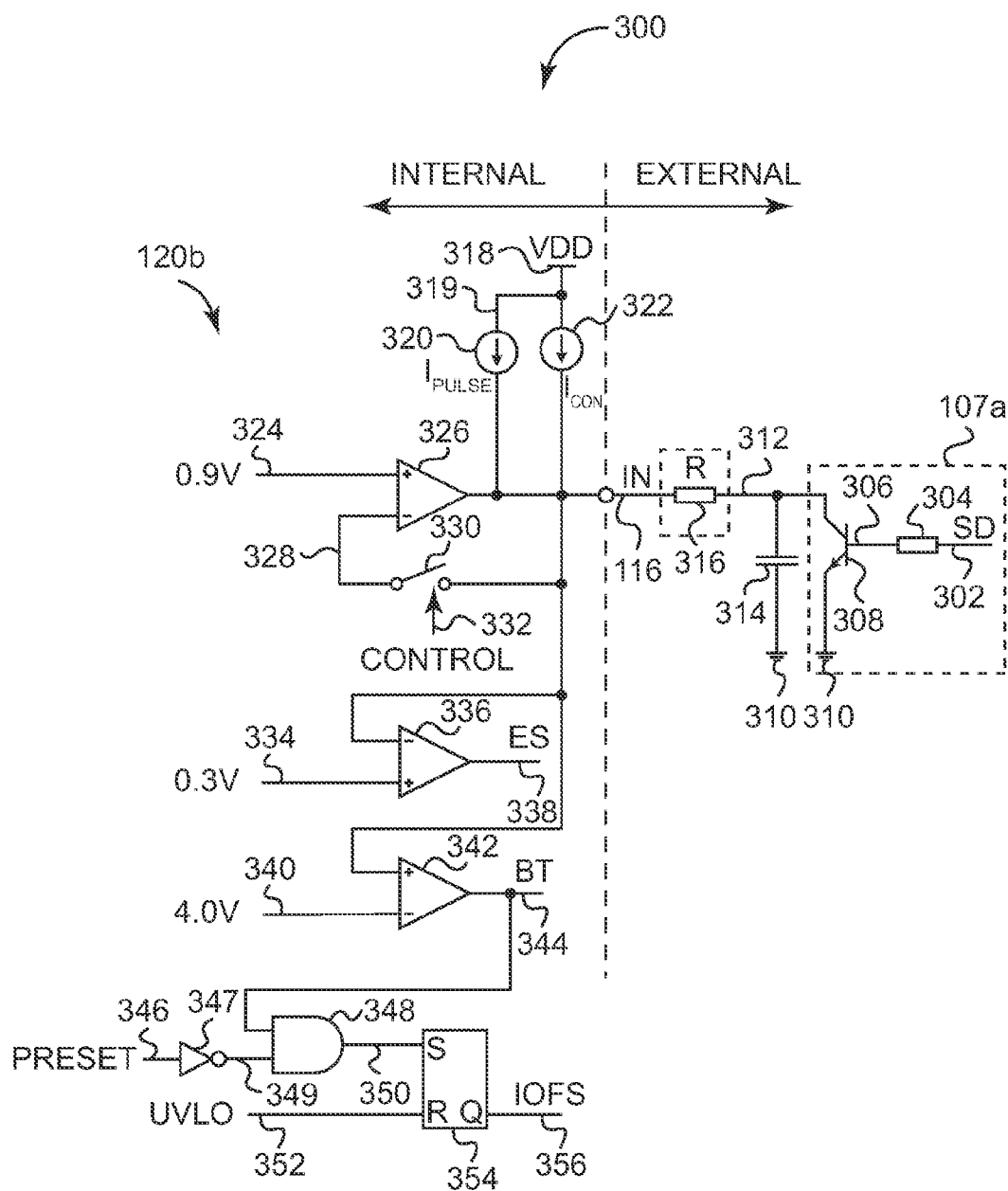
FIG. 5 is a schematic diagram illustrating one embodiment of a circuit for providing a blanking time function, an external shutdown function, and an internal oscillator frequency selection function on a single pin of a controller.

FIG. 5 is a schematic diagram illustrating one embodiment of a circuit 300 for providing a blanking time function, an external shutdown function, and an internal oscillator frequency selection function on a single pin of controller 120. Circuit 300 includes a portion external to controller 120 including an external shutdown circuit 107a, an external capacitor 314, and an optional external resistor 316. In one embodiment, circuit 107a includes a resistor 304 and a transistor 308. Circuit 300 also includes a portion 120b internal to controller 120. Internal portion 120b includes a voltage source (VDD) 318, a current pulse source ($I_{PULSE}$) 320, a continuous current source ($I_{CON}$) 322, an operational amplifier (op-amp) 326, a switch 330, comparators 336 and 342, an inverter 347, an AND gate 348, and a latch 354.

One side of resistor 304 receives an external shutdown (SD) signal on SD signal path 302. The other side of resistor 304 is electrically coupled to the base of transistor 308 through signal path 306. The emitter of transistor 308 is electrically coupled to ground 310. The collector of transistor 308 is electrically coupled to one side of optional external resistor 316 and one side of external capacitor 314 through signal path 312. The other side of external capacitor 314 is electrically coupled to ground 310. The other side of optional external resistor 316 is electrically coupled to IN signal path 116.

IN signal path 116 is electrically coupled to one side of current pulse source 320, one side of continuous current source 322, the output of op-amp 326, one side of switch 330, the negative input of comparator 336, and the positive input of comparator 342. The other side of current pulse source 320 and the other side of continuous current source 322 are electrically coupled to voltage source 318 through signal path 319. The positive input of op-amp 326 receives 0.9V or another suitable voltage on signal path 324. The negative input of op-amp 326 is electrically coupled to the other side of switch 330 through signal path 328. The control input of switch 330 receives a CONTROL signal on CONTROL signal path 332. The positive input of comparator 336 receives 0.3V or another suitable voltage on signal path 334. The output of comparator 336 provides the external shutdown (ES) signal on ES signal path 338.

The negative input of comparator 342 receives 4.0V or another suitable voltage on signal path 340. The output of comparator 342 is electrically coupled to a first input of AND gate 348 and provides the blanking time (BT) signal on BT signal path 344. The input of inverter 347 receives a PRESET signal on PRESET signal path 346. The output of inverter 347 is electrically coupled to a second input of AND gate 348 through signal path 349. The output of AND gate 348 is electrically coupled to the set (S) input of latch 354 through signal path 350. The reset (R) input of latch 354 receives an under voltage lockout (UVLO) signal on UVLO signal path 352. The output (Q) of latch 354 provides an internal oscillator frequency selection (IOFS) signal on IOFS signal path 356.

Circuit 107a initiates an external shutdown. External capacitor 314 is selected to provide a desired blanking time. Optional external resistor 316 is either included or excluded to select an internal oscillator frequency. In response to the feedback signal (FIG. 1) being greater than 4.5V, the CONTROL signal on CONTROL signal path 332 is logic high to indicate an overload condition. In response to the feedback signal being less than 4.5V, the CONTROL signal on CONTROL signal path 332 is logic low to indicate normal operation.

Switch 330 is controlled by the CONTROL signal on CONTROL signal path 332. In response to a logic high CONTROL signal, switch 330 opens to electrically disconnect signal path 328 from IN signal path 116. In response to a logic low CONTROL signal, switch 330 closes to electrically connect signal path 328 to IN signal path 116. In another embodiment, the logic levels of the CONTROL signal are reversed for controlling switch 330. With switch 330 closed, op-amp 326 maintains the voltage of the IN signal on IN signal path 116 at 0.9V. In response to an SD signal on SD signal path 302, transistor 308 pulls the IN signal toward ground 310. With switch 330 open, continuous current source 322 charges external capacitor 314.

Comparator 336 compares the IN signal on IN signal path 116 to 0.3V to provide the ES signal on ES signal path 338. In response to the IN signal falling below 0.3V, comparator 336 outputs a logic high ES signal to indicate an external shutdown. In response to the IN signal being greater than 0.3V, comparator 336 outputs a logic low ES signal.

Comparator 342 compares the IN signal on IN signal path 116 to 4.0V to provide the BT signal on BT signal path 344. In response to the IN signal rising above 4.0V, comparator 342 outputs a logic high BT signal indicating that the blanking time has elapsed. In response to the IN signal being less than 4.0V, comparator 342 outputs a logic low BT signal.

Inverter 347 inverts the PRESET signal on PRESET signal path 346 to provide the signal on signal path 349. AND gate 348 receives the BT signal on BT signal path 344 and the signal on signal path 349 to provide the signal on signal path 350. In response to a logic high BT signal and a logic high signal on signal path 349, AND gate 348 outputs a logic high signal on signal path 350. In response to a logic low BT signal and/or a logic low signal on signal path 349, AND gate 348 outputs a logic low signal on signal path 350.

The set input of latch 354 receives the signal on signal path 350 and the reset input of latch 354 receives the UVLO signal on UVLO signal path 352 to provide the IOFS signal on IOFS signal path 356. In response to a logic high signal on signal path 350, latch 354 is set and outputs a logic high IOFS signal. In response to a logic high UVLO signal, latch 354 is reset and outputs a logic low IOFS signal.

Circuit 300 provides a blanking time function, an external shutdown function, an internal oscillator frequency selection function using a single pin of controller 120. External resistor 316 is included to set a first internal oscillator frequency selection value. External resistor 316 is excluded to set a second internal oscillator frequency selection value. The following FIGS. 6-8B illustrate embodiments of the operation of circuit 300.

Figure 6:
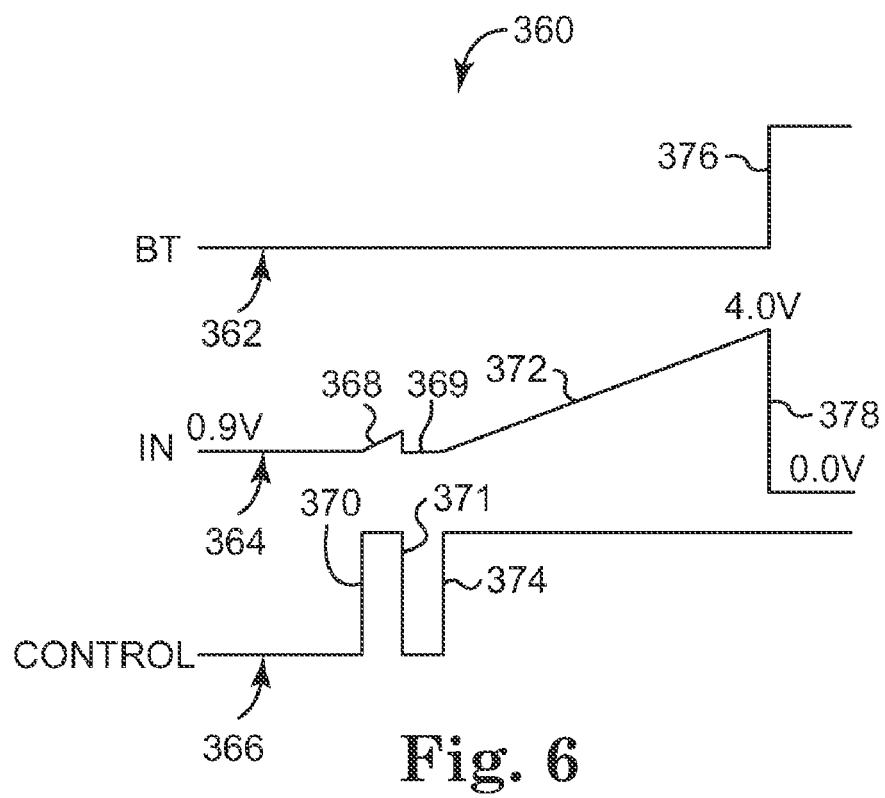
FIG. 6 is a timing diagram illustrating one embodiment of the blanking time function of the circuit illustrated in FIG. 5.

FIG. 6 is a timing diagram 360 illustrating one embodiment of the blanking time function of circuit 300. Timing diagram 360 includes the BT signal 362 on BT signal path 344, the IN signal 364 on IN signal path 116, and the CONTROL signal 366 on CONTROL signal path 332. During normal operation, current pulse source 320 is turned off and CONTROL signal 366 is logic low thereby closing switch 330. With switch 330 closed, op-amp 326 maintains IN signal 364 at 0.9V. With IN signal 364 at 0.9V, BT signal 362 is logic low.

In response to the feedback signal exceeding 4.5V indicating an overload condition, CONTROL signal 366 transitions to logic high at 370. In response to a logic high CONTROL signal 366, switch 330 opens and continuous current source 322 charges external capacitor 314 as indicated at 368 of IN signal 364. In response to the feedback signal falling back below 4.5V indicating a recovery from the overload condition, CONTROL signal 366 transitions to logic low at 371. In response to a logic low CONTROL signal 366, switch 330 closes and op-amp 326 returns IN signal 364 to 0.9V as indicated at 369.

In response to the feedback signal again exceeding 4.5V indicating an overload condition, CONTROL signal 366 transitions to logic high at 374. In response to a logic high CONTROL signal 366, switch 330 opens and continuous current source 322 charges external capacitor 314 as indicated at 372 of IN signal 364. In response to IN signal 364 reaching 4.0V at 378, comparator 342 outputs a logic high BT signal 362 at 376 to place controller 120 into an overload protection mode. The blanking time is set by the time it takes external capacitor 314 to charge from 0.9V up to 4.0V. Therefore, the blanking time can be adjusted to a desired length by selecting a suitable external capacitor 314.

Figure 7:
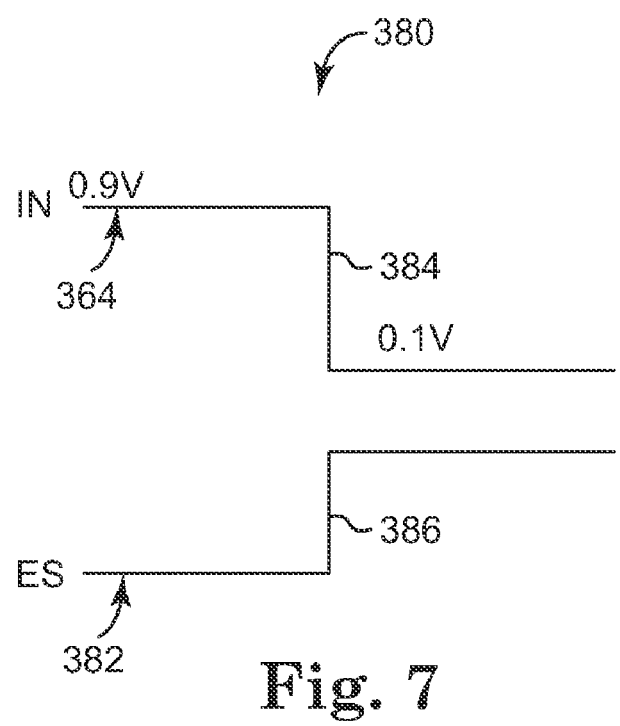
FIG. 7 is a timing diagram illustrating one embodiment of the external shutdown function of the circuit illustrated in FIG. 5.

FIG. 7 is a timing diagram 380 illustrating one embodiment of the external shutdown function of circuit 300. Timing diagram 380 includes IN signal 364 on IN signal path 116 and ES signal 382 on ES signal path 338. In response to an external shutdown signal on SD signal path 302 of circuit 107a, IN signal 364 is pulled down from 0.9V to below 0.3V, such as to 0.1V at 384. In response to the IN signal falling below 0.3V, comparator 336 outputs a logic high ES signal 382 at 386 to indicate an external shutdown.

Figure 8A:
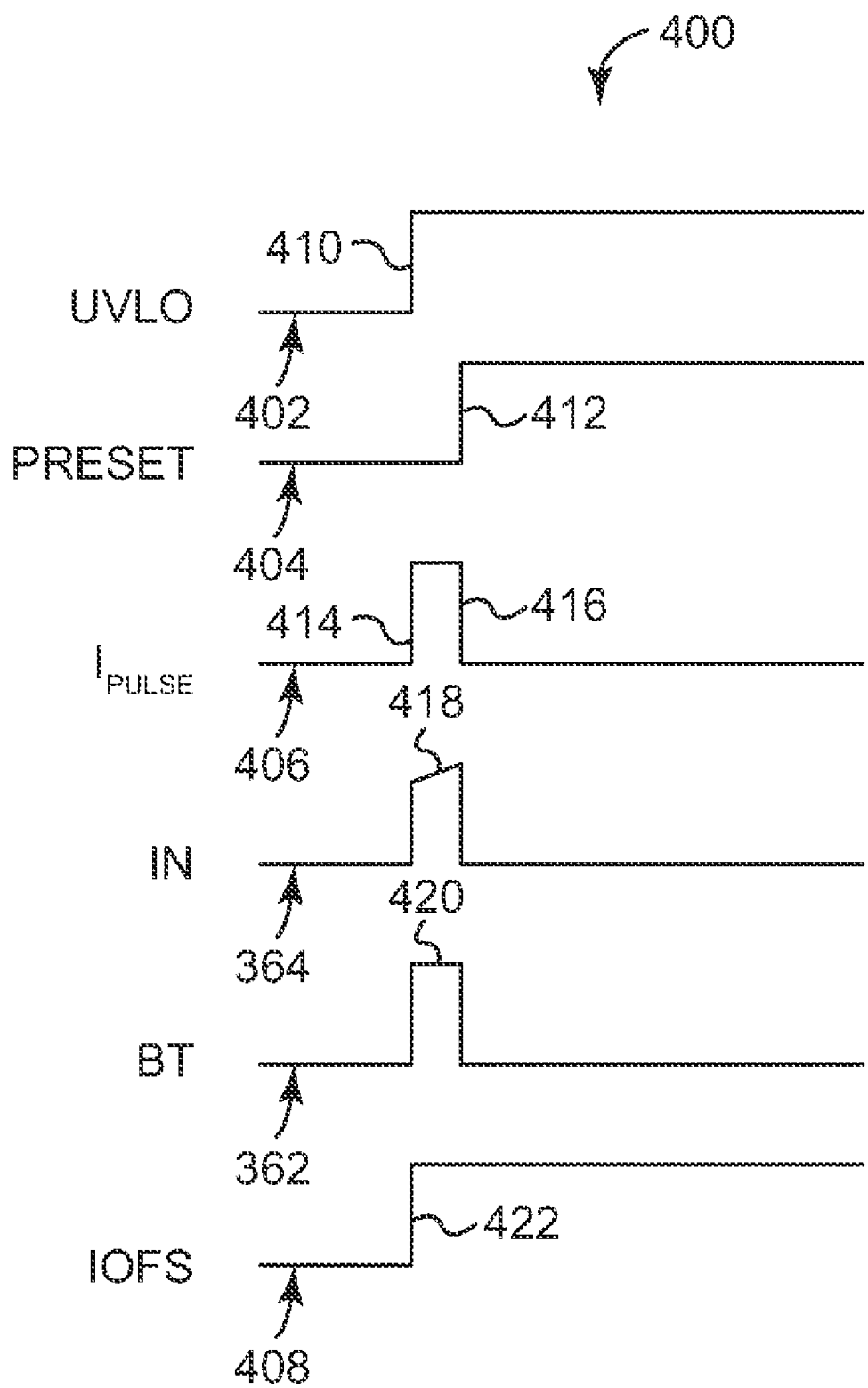
FIG. 8A is a timing diagram illustrating one embodiment of the internal oscillator frequency selection function of the circuit illustrated in FIG. 5.

FIG. 8A is a timing diagram 400 illustrating one embodiment of the internal oscillator frequency selection function of circuit 300. In this embodiment, external resistor 316 is included in circuit 300. Timing diagram 400 includes UVLO signal 402 on UVLO signal path 352, PRESET signal 404 on PRESET signal path 346, $I_{PULSE}$ current signal 406 on IN signal path 116, IN voltage signal 364 on IN signal path 116, BT signal 362 on BT signal path 344, and IOFS signal 408 on IOFS signal path 356.

Controller 120 begins operating in response to UVLO signal 402 transitioning to logic high at 410. In response to controller 120 beginning to operate, current pulse source 320 initiates a current pulse as indicated by $I_{PULSE}$ current signal 406 at 414. At this point, PRESET signal 404 remains logic low. After 3 µs or another suitable time, PRESET signal 404 transitions to logic high at 412. In response to the logic high PRESET signal 404, current pulse source 320 terminates the current pulse as indicated by $I_{PULSE}$ current signal 406 at 416.

With external resistor 316 included, the current pulse of $I_{PULSE}$ current signal 406 provides high current from IN signal path 116 to source resistor 316 and external capacitor 314. The high current immediately raises the voltage of IN signal 364 and gradually ramps up the voltage of IN signal 364 due to the charging of external capacitor 314 as indicated at 418. With IN signal 364 greater than 4.0V, comparator 342 outputs a logic high BT signal 362 as indicated at 420. In response to the logic high BT signal 362, AND gate 348 sets latch 354. With latch 354 set, latch 354 outputs a logic high IOFS signal 408 at 422. The logic high IOFS signal can be used to set the internal oscillator frequency of controller 120 to a first value.

Figure 8B:
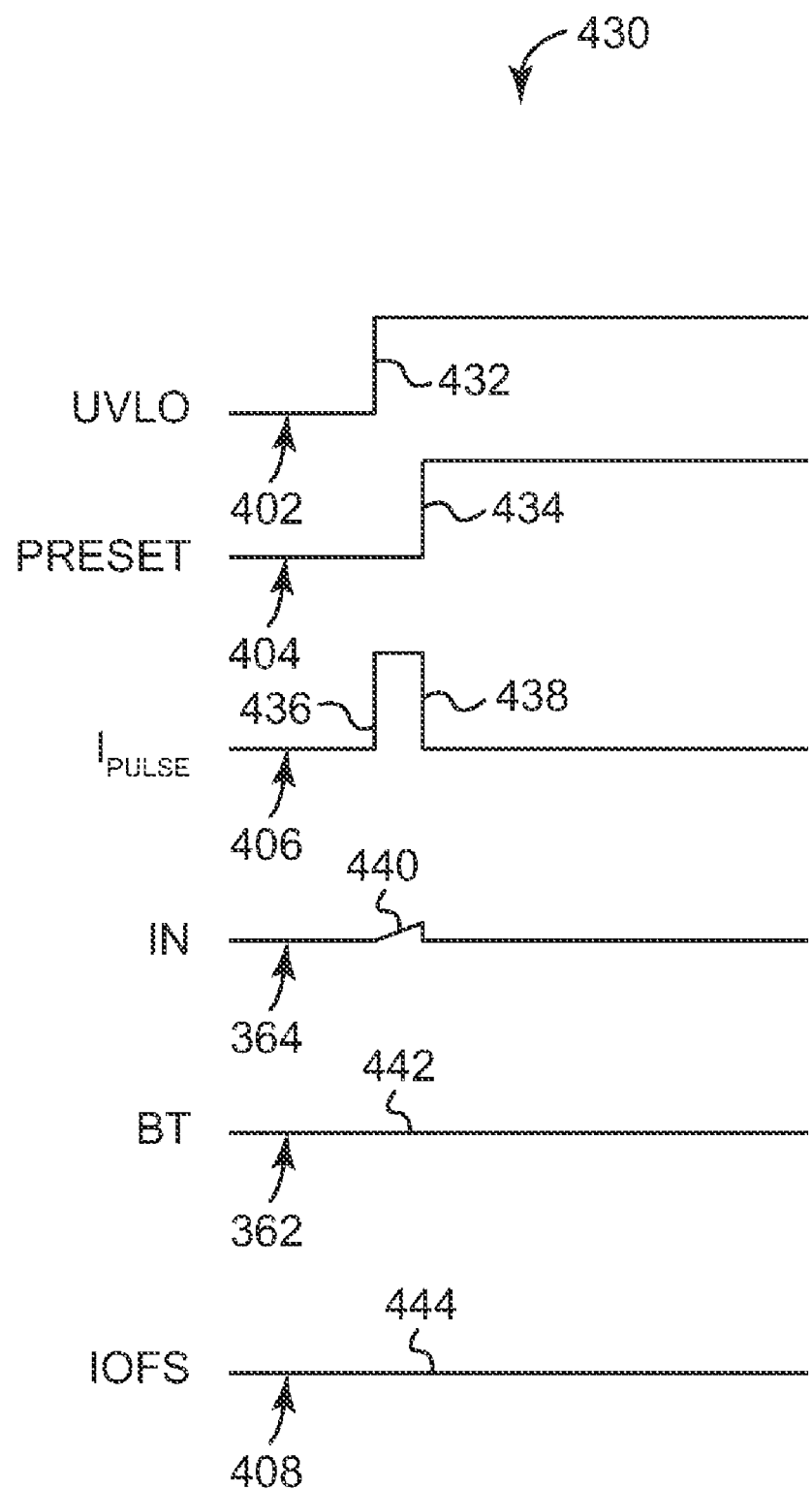
FIG. 8B is a timing diagram illustrating another embodiment of the internal oscillator frequency selection function of the circuit illustrated in FIG. 5.

FIG. 8B is a timing diagram 430 illustrating another embodiment of the internal oscillator frequency selection function of circuit 300. In this embodiment, external resistor 316 is excluded. Timing diagram 430 includes UVLO signal 402 on UVLO signal path 352, PRESET signal 404 on PRESET signal path 346, $I_{PULSE}$ current signal 406 on IN signal path 116, IN voltage signal 364 on IN signal path 116, BT signal 362 on BT signal path 344, and IOFS signal 408 on IOFS signal path 356.

Controller 120 begins operating in response to UVLO signal 402 transitioning to logic high at 432. In response to controller 120 beginning to operate, current pulse source 320 initiates a current pulse as indicated by $I_{PULSE}$ current signal 406 at 436. At this point, PRESET signal 404 remains logic low. After 3 μs or another suitable time, PRESET signal 404 transitions to logic high at 434. In response to the logic high PRESET signal 404, current pulse source 320 terminates the current pulse as indicated by $I_{PULSE}$ current signal 406 at 438.

With external resistor 316 excluded, the current pulse of $I_{PULSE}$ current signal 406 provides high current from IN signal path 116 to source external capacitor 314. IN signal 364 gradually ramps up due to the charging of external capacitor 314 as indicated at 440. With IN signal 364 less than 4.0V, comparator 342 outputs a logic low BT signal 362 as indicated at 442. In response to the logic low BT signal 362, latch 354 remains reset. With latch 354 reset, latch 354 maintains a logic low IOFS signal 408 as indicated at 444. The logic low IOFS signal can be used to set the internal oscillator frequency of controller 102 to a second value. Therefore, by either including or excluding external resistor 316, the internal oscillator frequency is set to one of two values.

Figure 9:
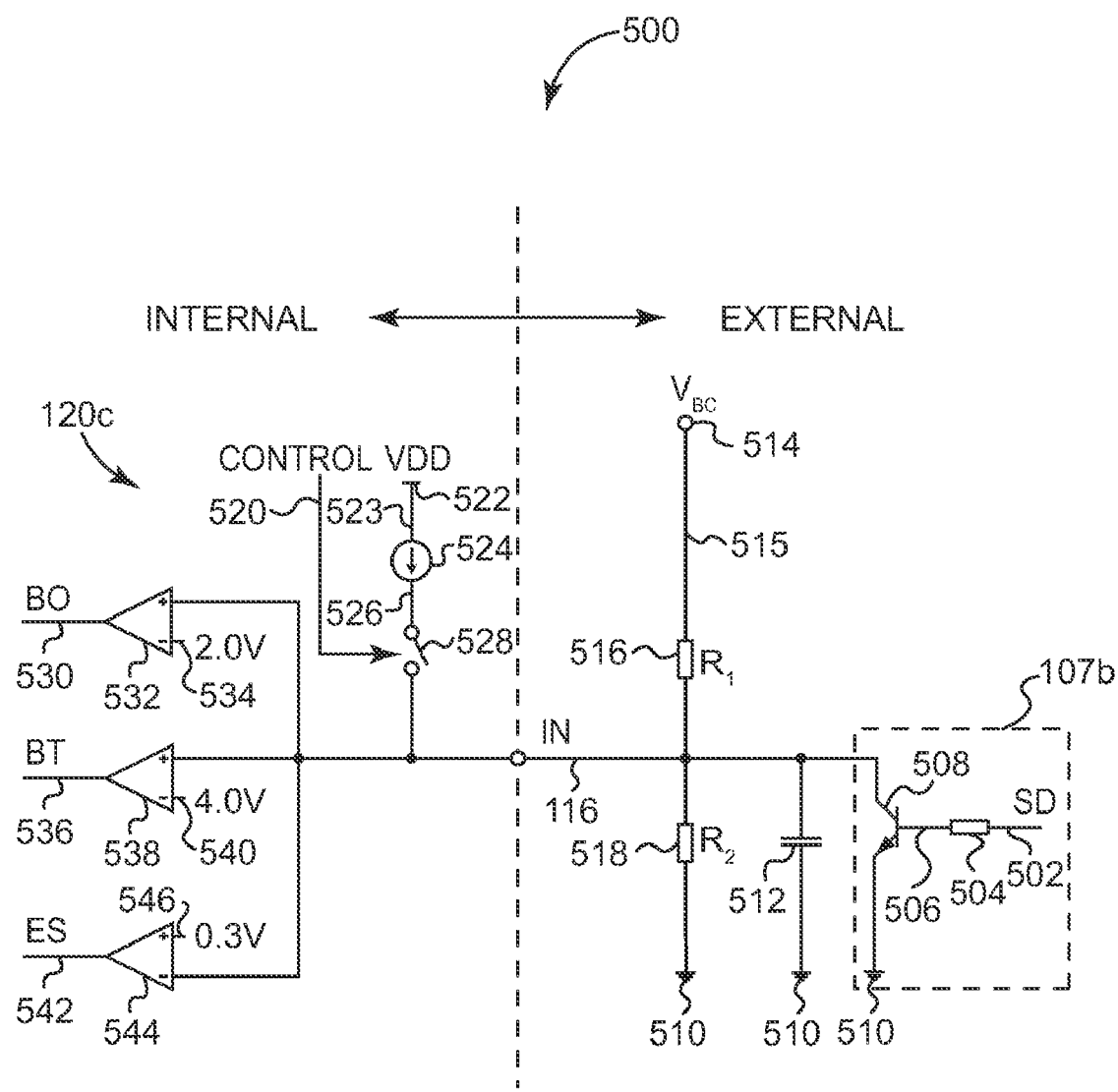
FIG. 9 is a schematic diagram illustrating one embodiment of a circuit for providing a blanking time function, a brownout function, and an external shutdown function on a single pin of a controller.

FIG. 9 is a schematic diagram illustrating one embodiment of a circuit 500 for providing a blanking time function, a brownout function, and an external shutdown function on a single pin of controller 120. Circuit 500 includes a portion external to controller 120 including an external shutdown circuit 107b, an external capacitor 512, resistors 516 and 518, and voltage over a buck capacitor ($V_{BC}$) as indicated at 514. In one embodiment, circuit 107b includes a resistor 504 and a transistor 508. Circuit 500 also includes a portion 120c internal to controller 120. Internal portion 120c includes a voltage source (VDD) 522, a current source 524, a switch 528, and comparators 532, 538, and 544. In one embodiment, comparator 532 includes hysteresis.

One side of resistor 504 receives an external shutdown (SD) signal on SD signal path 502. The other side of resistor 504 is electrically coupled to the base of transistor 508 through signal path 506. The emitter of transistor 508 is electrically coupled to ground 510. The collector of transistor 508 is electrically coupled to one side of resistor 516, one side of resistor 518, and one side of external capacitor 512 through IN signal path 116. The other side of external capacitor 512 and the other side of resistor 518 are electrically coupled to ground 510. The other side of resistor 516 is electrically coupled to $V_{BC}$ 514 through signal path 515.

IN signal path 116 is electrically coupled to one side of switch 528, the positive input of comparator 532, the positive input of comparator 538, and the negative input of comparator 544. The other side of switch 528 is electrically coupled to one side of current source 524. The other side of current source 524 is electrically coupled to voltage source 522 through signal path 523. The control input of switch 528 receives a CONTROL signal on CONTROL signal path 520. The negative input of comparator 532 receives 2.0V or another suitable voltage on signal path 534. The output of comparator 532 provides the brownout (BO) signal on BO signal path 530. The negative input of comparator 538 receives 4.0V or another suitable voltage on signal path 540. The output of comparator 538 provides the BT signal on BT signal path 536. The positive input of comparator 544 receives 0.3V or another suitable voltage on signal path 546. The output of comparator 544 provides the ES signal on ES signal path 542.

Circuit 107b initiates an external shutdown. External capacitor 512 is selected to provide a desired blanking time. Resistors 516 and 518 provide a voltage divider to divide $V_{BC}$ 514 to provide the IN signal on IN signal path 116. In response to the feedback signal being greater than 4.5V, the CONTROL signal on CONTROL signal path 520 is logic high to indicate an overload condition. In response to the feedback signal being less than 4.5V, the CONTROL signal on CONTROL signal path 520 is logic low to indicate normal operation.

Switch 528 is controlled by the CONTROL signal on CONTROL signal path 520. In response to a logic high CONTROL signal, switch 528 closes to electrically connect current source 524 to IN signal path 116. In response to a logic low CONTROL signal, switch 528 opens to electrically disconnect current source 524 from IN signal path 116. With switch 528 open, the voltage on IN signal path 116 is based on $V_{BC}$ 514 and the voltage divider provided by resistors 516 and 518. In response to an SD signal on SD signal path 502, transistor 508 pulls the IN signal toward ground 310. With switch 528 closed, current source 524 charges external capacitor 512.

Comparator 532 compares the IN signal on IN signal path 116 to 2.0V to provide the BO signal on BO signal path 530. In response to the IN signal rising above 2.0V, comparator 532 outputs a logic high BO signal indicating that $V_{BC}$ 514 is greater than a preset voltage. In response to the IN signal falling below 2.0V, comparator 532 outputs a logic low BO signal indicating a brownout condition where $V_{BC}$ 514 is less than the preset voltage.

Comparator 538 compares the IN signal on IN signal path 116 to 4.0V to provide the BT signal on BT signal path 536. In response to the IN signal rising above 4.0V, comparator 538 outputs a logic high BT signal indicating the blanking time has elapsed. In response to the IN signal being less than 4.0V, comparator 538 outputs a logic low BT signal.

Comparator 544 compares the IN signal on IN signal path 116 to 0.3V to provide the ES signal on ES signal path 542. In response to the IN signal falling below 0.3V, comparator 544 outputs a logic high ES signal indicating an external shutdown. In response to the IN signal being greater than 0.3V, comparator 544 outputs a logic low ES signal.

Figure 11:
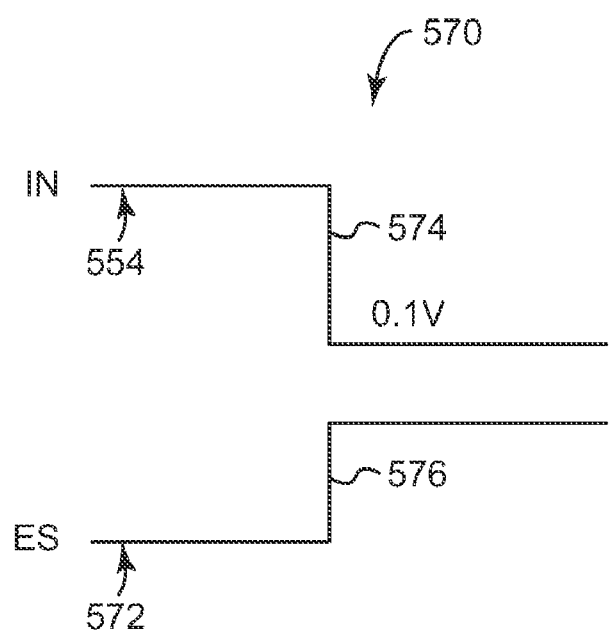
FIG. 11 is a timing diagram illustrating one embodiment of the external shutdown function of the circuit illustrated in FIG. 9.
Figure 12:
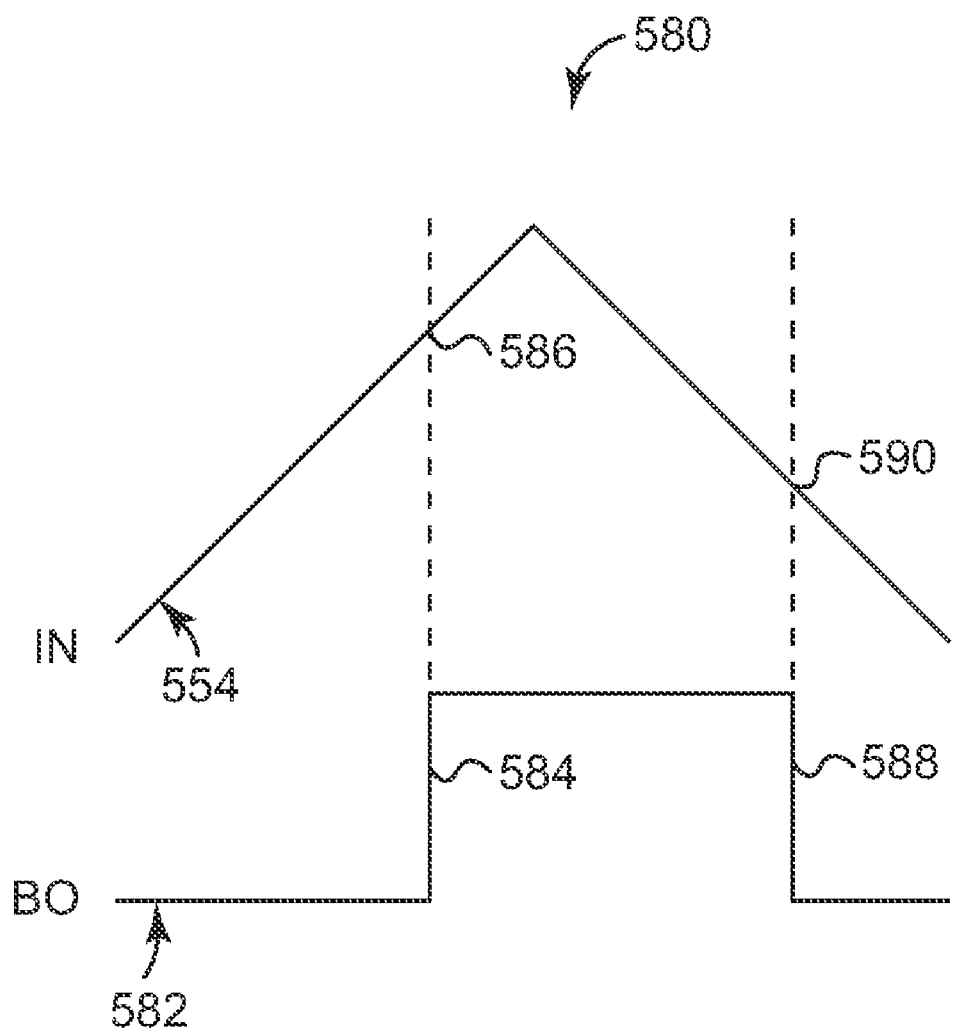
FIG. 12 is a timing diagram illustrating one embodiment of the brownout function of the circuit illustrated in FIG. 9.

Circuit 500 provides a blanking time function, an external shutdown function, and a brownout function using a single pin of controller 120. The following FIGS. 10-12 illustrate embodiments of the operation of circuit 500.

Figure 10:
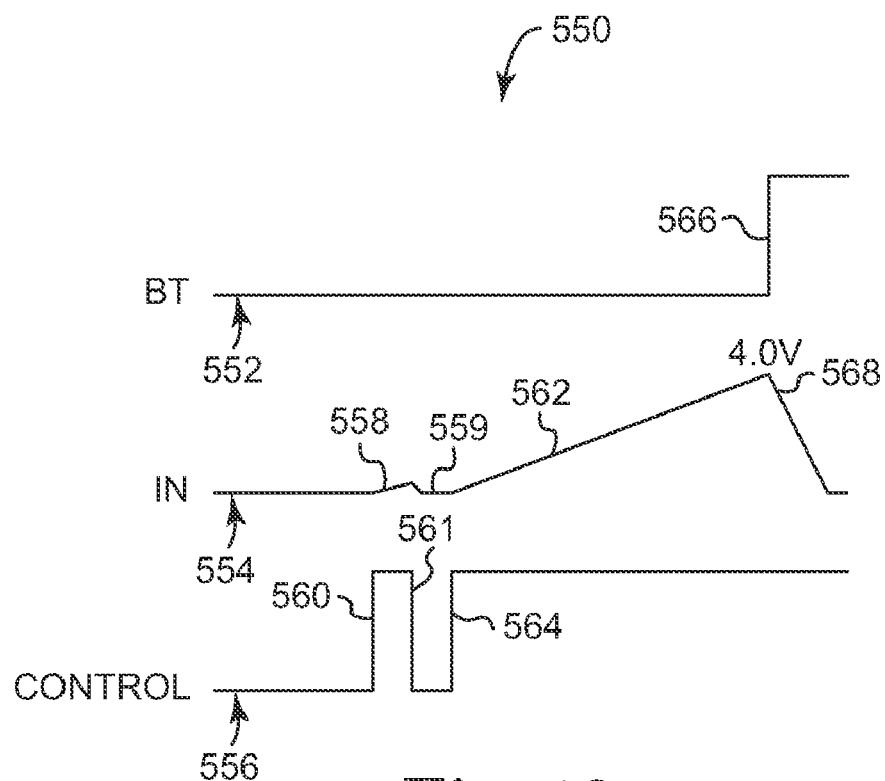
FIG. 10 is a timing diagram illustrating one embodiment of the blanking time function of the circuit illustrated in FIG. 9.

FIG. 10 is a timing diagram 550 illustrating one embodiment of the blanking time function of circuit 500. Timing diagram 550 includes the BT signal 552 on BT signal path 536, the IN signal 554 on IN signal path 116, and the CONTROL signal 556 on CONTROL signal path 520. During normal operation, CONTROL signal 556 is logic low thereby opening switch 528. With switch 528 open, IN signal 554 is maintained at a voltage based on $V_{BC}$ 514 and the voltage divider provided by resistors 516 and 518. At this time, the voltage of IN signal 554 is below 4.0V; therefore BT signal 552 is logic low.

In response to the feedback signal (FIG. 1) exceeding 4.5V indicating an overload condition, CONTROL signal 556 transitions to logic high at 560. In response to a logic high CONTROL signal 556, switch 528 closes and current source 524 charges external capacitor 512 as indicated at 558 of IN signal 554. In response to the feedback signal falling back below 4.5V indicating a recovery from the overload condition, CONTROL signal 556 transitions to logic low at 561. In response to a logic low CONTROL signal 556, switch 528 opens and the voltage of IN signal 554 returns to its previous value as indicated at 559.

In response the feedback signal again exceeding 4.5V indicating an overload condition, CONTROL signal 556 transitions to logic high at 564. In response to a logic high CONTROL signal 556, switch 528 closes and current source 524 charges external capacitor 512 as indicated at 562 of IN signal 554. In response to IN signal 554 reaching 4.0V at 568, comparator 538 outputs a logic high BT signal 552 at 566 to place controller 120 into an overload protection mode. The blanking time is set by the time it takes external capacitor 512 to charge from the value based on $V_{BC}$ 514 and the voltage divider provided by resistors 516 and 518 up to 4.0V. Therefore, the blanking time can be adjusted to a desired length by selecting a suitable external capacitor 512.

FIG. 11 is a timing diagram 570 illustrating one embodiment of the external shutdown function of circuit 500. Timing diagram 570 includes IN signal 554 on IN signal path 116 and ES signal 572 on ES signal path 542. In response to an external shutdown signal on SD signal path 502 of circuit 107b, IN signal 554 is pulled down from the voltage based on $V_{BC}$ 514 and the voltage divider provided by resistors 516 and 518 to below 0.3V, such as to 0.1V at 574. In response to the IN signal falling below 0.3V, comparator 544 outputs a logic high ES signal 572 at 576 to indicate an external shutdown.

FIG. 12 is a timing diagram 580 illustrating one embodiment of the brownout function of circuit 500. Timing diagram 580 includes IN signal 554 on IN signal path 116 and BO signal 582 on BO signal path 530. In response to IN signal 554 rising above the high voltage threshold of comparator 532 as indicated at 586, comparator 532 outputs a logic high BO signal 582 at 584. In response to IN signal 554 falling below the low voltage threshold of comparator 532 as indicated at 590, comparator 532 outputs a logic low BO signal 582 at 588 to indicate a brownout condition.

Figure 13:
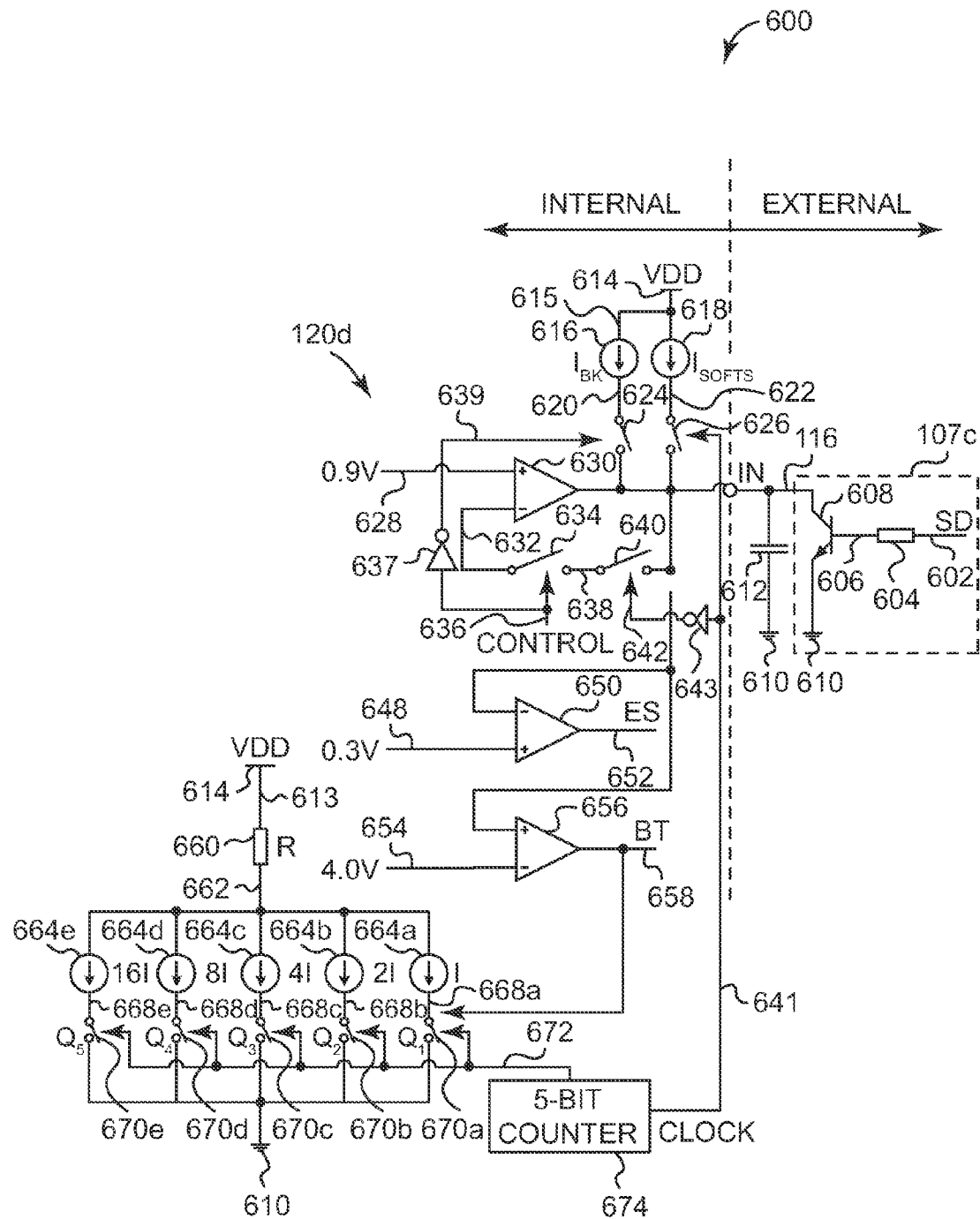
FIG. 13 is a schematic diagram illustrating one embodiment of a circuit for providing a blanking time function, an external shutdown function, and a variable soft start function on a single pin of a controller.

FIG. 13 is a schematic diagram illustrating one embodiment of a circuit 600 for providing a blanking time function, an external shutdown function, and a variable soft start function on a single pin of controller 120. Circuit 600 includes a portion external to controller 120 including an external shutdown circuit 107c and an external capacitor 612. In one embodiment, circuit 107c includes a resistor 604 and a transistor 608. Circuit 600 also includes a portion 120d internal to controller 120. Internal portion 120d includes voltage source (VDD) 614, a blanking time current source ($I_{BK}$) 616, a soft start current source ($I_{SOFTS}$) 618, switches 624, 626, 634, and 640, op-amp 630, inverters 637 and 643, and comparators 650 and 656. Circuit 120d also includes a soft start circuit including a resistor 660, current sources 664a-664e, switches 670a-670e, and a 5-bit counter 674.

One side of resistor 604 receives an external shutdown (SD) signal on SD signal path 602. The other side of resistor 604 is electrically coupled to the base of transistor 608 through signal path 606. The emitter of transistor 608 is electrically coupled to ground 610. The collector of transistor 608 is electrically coupled to one side of external capacitor 612 through IN signal path 116. The other side of external capacitor 612 is electrically coupled to ground 610.

IN signal path 116 is electrically coupled to the output of op-amp 630, one side of switch 624, one side of switch 626, one side of switch 640, the negative input of comparator 650, and the positive input of comparator 656. The other side of switch 624 is electrically coupled to one side of current source 616 through signal path 620. The other side of switch 626 is electrically coupled to one side of current source 618 through signal path 622. The other side of current source 616 and the other side of current source 618 are electrically coupled to voltage source 614 through signal path 615.

The control input of switch 626 and the input of inverter 643 are electrically coupled to an output of counter 674 through CLOCK signal path 641. The output of inverter 643 is electrically coupled to the control input of switch 640 through signal path 642. The control input of switch 634 and the input of inverter 637 receive a CONTROL signal on CONTROL signal path 636. The output of inverter 637 is electrically coupled to the control input of switch 624 through signal path 639.

The positive input of op-amp 630 receives 0.9V or another suitable voltage on signal path 628. The negative input of op-amp 630 is electrically coupled to one side of switch 634 through signal path 632. The other side of switch 634 is electrically coupled to the other side of switch 640 through signal path 638. The positive input of comparator 650 receives 0.3V or another suitable voltage on signal path 648. The output of comparator 650 provides the ES signal on ES signal path 652. The negative input of comparator 656 receives 4.0V or another suitable voltage on signal path 654. The output of comparator 656 provides the BT signal and is electrically coupled to the control input of switches 670a-670e through BT signal path 658.

One side of resistor 660 is electrically coupled to voltage source 614 through signal path 613. The other side of resistor 660 is electrically coupled to one side of each current source 664a-664e through signal path 662. The other side of each current source 664a-664e is electrically coupled to one side of each switch 670a-670e through each data path 668a-668e, respectively. The other side of each switch 670a-670e is electrically coupled to ground 610. The control input of each switch 670a-670e is electrically coupled to an output of counter 674 through signal path 672.

Circuit 107c initiates an external shutdown. External capacitor 612 is selected to provide a desired blanking time and a desired soft start step time. In response to the feedback signal being greater than 4.5V, the CONTROL signal on CONTROL signal path 636 is logic high to indicate an overload condition. In response to the feedback signal being less than 4.5V, the CONTROL signal on CONTROL signal path 636 is logic low to indicate normal operation.

Switch 634 is controlled by the CONTROL signal on CONTROL signal path 636. In response to a logic low CONTROL signal, switch 634 closes to electrically connect signal path 632 to signal path 638. In response to a logic high CONTROL signal, switch 634 opens to electrically disconnect signal path 632 from signal path 638. Inverter 637 inverts the CONTROL signal on CONTROL signal path 636 to provide the signal on signal path 639.

Switch 624 is controlled by the signal on signal path 639. In response to a logic low signal on signal path 639, switch 624 closes to electrically connect current source 616 to IN signal path 116. In response to a logic high signal on signal path 639, switch 624 opens to electrically disconnect current source 616 from IN signal path 116.

Switch 626 is controlled by the CLOCK signal on CLOCK signal path 641. In response to a logic low CLOCK signal, switch 626 closes to electrically connect current source 618 to IN signal path 116. In response to a logic high CLOCK signal, switch 626 opens to electrically disconnect current source 618 from IN signal path 116. Inverter 643 inverts the CLOCK signal on CLOCK signal path 641 to provide the signal on signal path 642.

Switch 640 is controlled by the signal on signal path 642. In response to a logic low signal on signal path 642, switch 640 closes to electrically connect signal path 638 to IN signal path 116. In response to a logic high signal on signal path 642, switch 640 opens to electrically disconnect signal path 638 from IN signal path 116.

With switches 634 and 640 closed and switches 624 and 626 open, op-amp 630 maintains the voltage of the IN signal on IN signal path 116 at 0.9V. In response to an SD signal on SD signal path 602, transistor 608 pulls the IN signal toward ground 610. With switches 634 and 626 open and switches 640 and 624 closed, current source 616 charges external capacitor 612. With switches 634 and 626 closed and switches 640 and 624 open, current source 618 charges external capacitor 612.

Comparator 650 compares the IN signal on IN signal path 116 to 0.3V to provide the ES signal on ES signal path 652. In response to the IN signal falling below 0.3V, comparator 650 outputs a logic high ES signal to indicate an external shutdown. In response to the IN signal being greater than 0.3V, comparator 650 outputs a logic low ES signal.

Comparator 656 compares the IN signal on IN signal path 116 to 4.0V to provide the BT signal on BT signal path 658. In response to the IN signal rising above 4.0V, comparator 656 outputs a logic high BT signal indicating that the blanking time has elapsed or a soft start step is completed. In response to the IN signal being less than 4.0V, comparator 656 outputs a logic low BT signal.

Counter 674 provides a 5-bit count signal to switches 670a-670e through signal path 672. In response to a logic high bit, the respective switch 670a-670e closes to enable the respective current source 664a-664e. In response to a logic low bit, the respective switch 670a-670e opens to disable the respective current source 664a-664e.

Circuit 600 provides a blanking time function, an external shutdown function, and a variable soft start function using a single pin of controller 120. The blanking time function of circuit 600 operates similarly to the blanking time function of circuit 300 previously described and illustrated with reference to FIGS. 5 and 6. The external shutdown function of circuit 600 operates similarly to the external shutdown function of circuit 300 previously described and illustrated with reference to FIGS. 5 and 7. The following FIGS. 14 and 15 illustrate embodiments of the operation of the variable soft start function of circuit 600.

Figure 14:
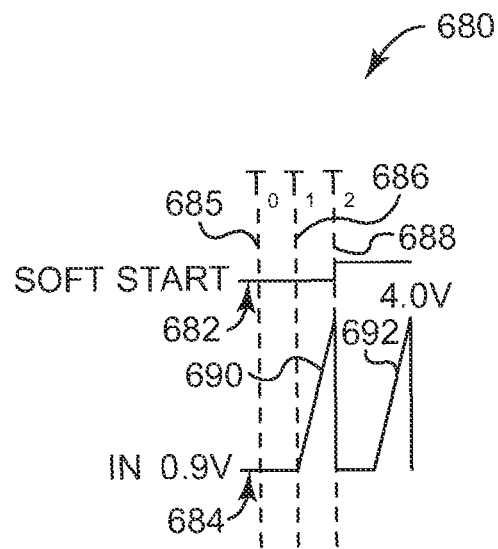
FIG. 14 is a timing diagram illustrating one embodiment of the soft start function of the circuit illustrated in FIG. 13.

FIG. 14 is a timing diagram 680 illustrating one embodiment of the variable soft start function of circuit 600. Timing diagram 680 includes a SOFT START signal 682 and IN signal 684 on IN signal path 116. During a soft start operation, switch 634 remains closed and switch 624 remains open. Each soft start step includes two periods controlled by the CLOCK signal. For example, for a first period from $t_0$ 685 to $t_1$ 686, the CLOCK signal is logic low to close switch 640 and open switch 626. During this period, op-amp 630 maintains the IN signal 684 at 0.9V. This time period is fixed for a default time by counter 674.

After the default time, counter 674 outputs a logic high CLOCK signal to open switch 640 and close switch 626. With switch 626 closed, current source 618 charges external capacitor 612 from 0.9V to 4.0V from $t_1$ 686 to $t_2$ 688 as indicated at 690 on IN signal 684. The time it takes to charge capacitor 612 from 0.9V to 4.0V can be adjusted to a desired value by selecting a suitable external capacitor 612. Once IN signal 684 reach 4.0V, comparator 656 outputs a logic high BT signal. The logic high BT signal ends the soft start step at $t_2$ 685. Counter 674 then increments and SOFT START signal 682 steps up. The process is repeated as indicated at 692 for the following soft start steps.

Figure 15:
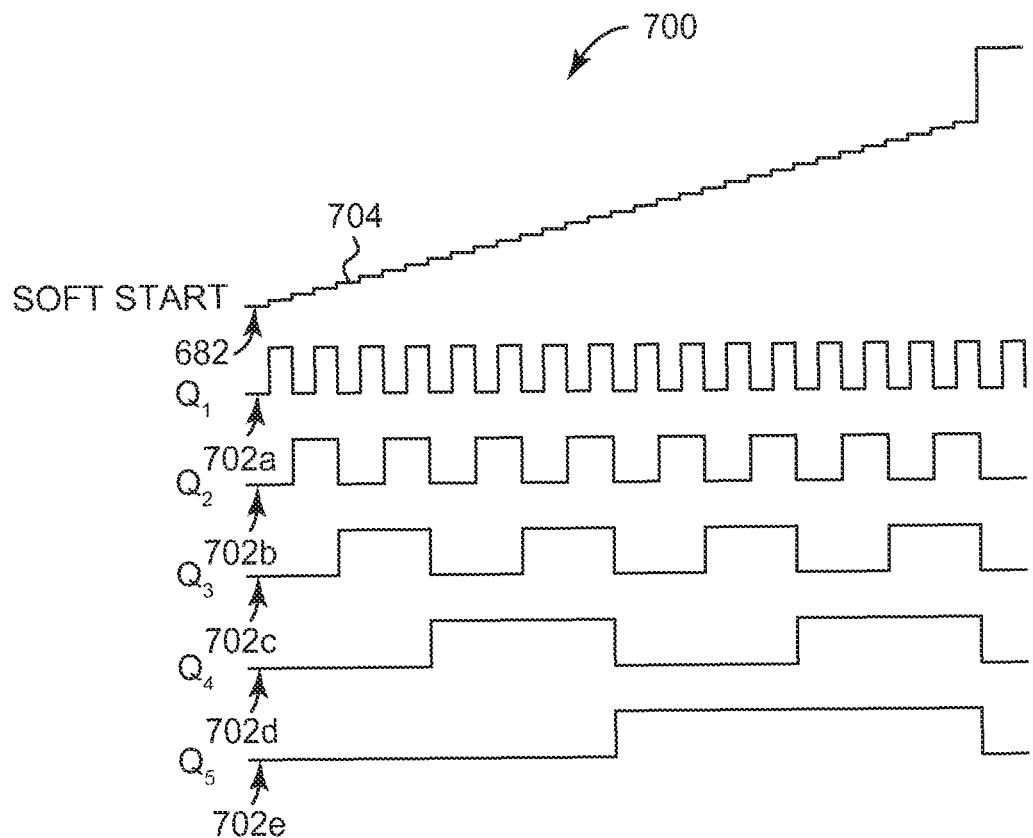
FIG. 15 is a timing diagram illustrating one embodiment of the soft start function of the circuit illustrated in FIG. 13.

FIG. 15 is a timing diagram 700 illustrating one embodiment of the soft start function of circuit 600. Timing diagram 700 includes soft start signal 682 and the status 702a-702e of each switch Q1 670a through Q5 670e, respectively. A logic high signal 702a-702e indicates the respective switch 670a-670e is closed and a logic low signal 702a-702e indicates the respective switch 670a-670e is open. The first portion of each step, such as step 704, of SOFT START signal 682 has a fixed length and the second portion of each step of SOFT START signal 682 has a length based on the charging of external capacitor 612 as previously described and illustrated with reference to FIG. 14.

Embodiments provide a controller for a voltage converter. The controller provides multiple functions on a single pin. In one embodiment, the feedback signal is received and a blanking time function is provided on a single pin. In another embodiment, a blanking time function, an external shutdown function, and an internal frequency selection function are provided on a single pin. In another embodiment, a blanking time function, an external shutdown function, and a brownout function are provided on a signal pin. In another embodiment, a blanking time function, an external shutdown function, and a variable soft start function are provided on a single pin. By combining multiple functions on a single pin of the controller, the pin count of the controller is minimized while still enabling the user to adjust the operation of the controller.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An integrated circuit comprising:
    a controller configured to regulate an output of a power supply based on a first signal; and
    an input configured to receive the first signal and to be coupled to an external capacitor that sets an adjustable blanking time for the power supply,
    wherein the controller comprises:
        a switch configured to discharge the external capacitor in response to the first signal charging the external capacitor to a preset voltage; and
        a counter configured to count charge-discharge cycles of the external capacitor and provide a second signal in response to the counter reaching a preset count.

2. The integrated circuit of claim 1, wherein the power supply comprises a switching mode power supply.

3. The integrated circuit of claim 1, wherein the power supply comprises an AC to DC converter.

4. The integrated circuit of claim 1, wherein the controller comprises:

a timer configured to reset the counter in response to the first signal not charging the external capacitor to the preset voltage within a preset period.

5. A power supply comprising:

a voltage converter configured to provide an output voltage and a first signal;

an input configured to receive the first signal;

a controller configured to regulate the output voltage based on the first signal; and a capacitor coupled to the input, the capacitor setting an adjustable blanking time for the voltage converter, wherein the controller comprises:

a switch configured to discharge the capacitor in response to the first signal charging the capacitor to a preset voltage; and a counter configured to count charge-discharge cycles of the capacitor and provide a second signal in response to the counter reaching a preset count.

6. The power supply of claim 5, wherein the power supply comprises a switching mode power supply.

7. The power supply of claim 5, wherein the voltage converter comprises an AC to DC converter.

8. The power supply of claim 5, wherein the controller comprises:

a timer configured to reset the counter in response to the first signal not charging the capacitor to the preset voltage within a preset period.

9. A method for operating a power supply, the method comprising:

providing a controller configured to regulate an output of a power supply based on a first signal;

providing an input configured to receive the first signal;

providing a capacitor coupled to the input that sets an adjustable blanking time for the power supply;

regulating the output of the power supply based on the first signal; and providing a second signal in response to the blanking time being exceeded, wherein providing the second signal comprises:

discharging the capacitor in response to the first signal charging the capacitor to a preset voltage;

counting charge-discharge cycles of the capacitor; and providing the second signal in response to the count of charge-discharge cycles reaching a preset count.

10. The method of claim 9, wherein providing the controller comprises providing a controller configured to regulate an output of a switching mode power supply.

11. The method of claim 9, wherein providing the controller comprises providing a controller configured to regulate an output of a power supply comprising an AC to DC converter.

12. The method of claim 9, further comprising:

resetting the count of charge-discharge cycles in response to the first signal not charging the capacitor to the preset voltage within a preset period.

* * * * *